(12) United States Patent
Nagashima

(10) Patent No.: US 6,222,687 B1
(45) Date of Patent: Apr. 24, 2001

(54) OBJECT LEN SUPPORTING UNIT COMPENSATING FOR INCLINATION OF OBJECT LENS

(75) Inventor: Yoshihisa Nagashima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/438,842

(22) Filed: Nov. 12, 1999

(30) Foreign Application Priority Data

Nov. 12, 1998 (JP) .................................................. 10-322598

(51) Int. Cl.[7] ........................................................ G02B 7/02
(52) U.S. Cl. ............................................. 359/819; 359/822
(58) Field of Search .................................... 359/822, 819, 359/823, 824, 814

(56) References Cited

U.S. PATENT DOCUMENTS 5,956,188 * 12/1999 Lee ........................................ 359/822

FOREIGN PATENT DOCUMENTS

| 59-223953 | 12/1984 | (JP) | ................................. | G11B/7/08 |
| 8-180423 | 7/1996 | (JP) | ................................. | G11B/7/08 |
| 10-269584 | 10/1998 | (JP) | ................................. | G11B/7/085 |

OTHER PUBLICATIONS

Japanese Office Action dated Jan. 25, 2000 with partial translation.

* cited by examiner

*Primary Examiner*—Georgia Epps
*Assistant Examiner*—Sayeed Seyrafi
(74) *Attorney, Agent, or Firm*—McGinn & Gibb, PLLC

(57) ABSTRACT

In An object lens supporting unit compensating for inclination of an object lens L, which comprises a supporting frame (2), a base member (3), an adjusting mechanism (4), the adjusting mechanism 4 comprises a pedestal portion (41), protrudent portions (42), and holding unit (5). The pedestal portion (41) has a curved surface formed along a surface of a supposed revolution body. The supposed revolution body is formed by rotation of an ellipse D around a minor axis thereof. The supposed revolution body is further inscribed to a supposed spherical surface C formed around a central point. The central point is served by a principal point L1 of the object lens L supported by the supporting frame (2). The protrudent portions (42) are arranged so as to be in contact with the curved surface at positions which correspond to an area of the supposed revolution body inscribed to the supposed spherical surface C.

6 Claims, 9 Drawing Sheets

OBJECT LEN SUPPORTING UNIT COMPENSATING FOR INCLINATION OF OBJECT LENS

BACKGROUND OF THE INVENTION

This invention relates to an object lens supporting unit for supporting an object lens, in particular, to the unit capable of compensating for inclination of the object lens when an optical and electrical apparatus provided with the object lens is manufactured.

Generally, the object lens supporting unit is applied in an optical disk drive for reading/writing data from/to an optical recording medium of disk type by irradiating laser beam to the medium and optically sensing reflected laser beam from the medium/by irradiating laser beam to the medium. The object lens supporting unit is driven in such direction that traverse innumerable tracks formed on the optical medium and is stopped on a target track. Thus, the unit carried out to irradiate the track and to read/write data from/to the track.

Conventionally, to compensate for the inclination of the object lens, various remedies have been contrived. Basically, to compensate for the inclination of the object lens, it requires a mechanism for adjusting inclination of the object lens and mechanisms for compensating for distance deviation of the object lens in focusing and tracking directions caused by the adjusting of inclination of the objects lens. Herein, the focusing direction is a direction vertical to a recording surface on a disc type-recording medium, while the tracking direction is a direction transverse recording tracks formed on the recording medium. Therefore, the conventional structure for compensating for the inclination fo the object lens is complex in structure.

To settle matter mentioned above, an object lens supporting unit related to this invention is disclosed in Japanese Patent Unexamined Publication (A) No. 223953/1984.

The unit uses a concave pedestal for adjusting the inclination of the object lens in an object lens drive. The unit comprises a supporting base for supporting the object lens and a head case for supporting the supporting thereon. The supporting base is provided with convex and spherical parts on a bottom surface thereof. The head case is provided with the concave pedestal on an upper surface thereof. The concave pedestal has a concave surface along a spherical surface of an imaginary or a supposed sphere drawn around a principal point of the object lens as central point. In other words, the concave surface has a supposed central point which positionally coincides with the principal point of the object lens. Since the supporting base is supported on the head case through only the convex and spherical parts, the convex and spherical parts can be slid on the spherical surface of the concave pedestal. Therefore, the entire supporting base can be tilted in every direction around the principal point of the object lens. This structure has an advantage that the principal point of the object lens is almost invariable in position. It is therefore unnecessary to compensate for distance deviation of the object lens in focusing and tracking directions after the object lens was adjusted for the inclination thereof.

However, it is difficult for this structure to reduce in thickness because the head case requires a relatively large thickness in order to secure a space for forming the spherical surface of the concave pedestal. If optical system of this structure is reduced in height with the structure maintained basically, it becomes difficult to put the supposed central point of the concave pedestal onto the principal point of the object lens. Namely, if it is required to reduce a height size as a first priority in the structure, the object lens deviates in the focusing and/or the tracking directions when it was adjusted the inclination. In the event, the above-mentioned advantage is spoiled. As described above, the related technique is practically unsuitable to reduce in height and to apply into apparatuses such as portable or mobile computers requested to reduce in height.

SUMMARY OF THE INVENTION

It is an object of this invention to solute disadvantages mentioned above and to therefore provide an object lens supporting unit which compensates for inclination of an object lens capable of reducing in height.

The other object, features, and advantages of this invention will become clear as the description proceeds.

This invention is directed to an object lens supporting unit used for supporting an object lens for converging laser beam irradiated from a laser source in a constant direction, which comprises a supporting frame for supporting the object lens, a base member for mounting the supporting frame thereon, an adjusting mechanism for adjusting the supporting frame with the supporting frame universally tilted to the base member, the adjusting mechanism comprising a pedestal portion formed on a top surface of the base member, a plurality of protrudent portions protruded from a bottom surface of the supporting frame, in contact with the pedestal portion, and capable of freely sliding along the pedestal portion, and holding means for limiting the protrudent portions within a predetermined sliding range. The pedestal portion has a curved surface formed along a surface of a supposed revolution body. The supposed revolution body is formed by rotation of an ellipse around a minor axis thereof. The supposed revolution body is further inscribed to a supposed spherical surface formed around a central point. The central point is served by a principal point of the object lens supported by the supporting frame. The protrudent portions are arranged so as to be in contact with the curved surface at positions which correspond to an area of the supposed revolution body inscribed to the supposed spherical surface.

This invention is further directed to an object lens supporting unit used for supporting an object lens for converging laser beam irradiated from a laser source in a constant direction, which comprises a supporting frame for supporting the object lens, a base member for mounting the supporting frame thereon, an adjusting mechanism for adjusting the supporting frame with the supporting frame universally tilted to the base member, the adjusting mechanism comprising a pedestal portion formed on a top surface of the base member, a first and a second protrudent portions protruded from a bottom surface of the supporting frame, in contact with the pedestal portion, and capable of freely sliding along the pedestal portion, the first and the second protrudent portions being equal in size to each other, and holding means for limiting the motion of each of the first protrudent portion and the second protrudent portions within a predetermined sliding range. The pedestal portion has a curved surface including a first and a second curved surfaces. The first surface is formed along a part of a first supposed revolution body. The second curved surface is formed along a part of a second supposed revolution body. The first supposed revolution body is formed by rotation of a first partial supposed ellipse around an optical axis through which the laser beam is passed. The second supposed revolution body is formed by rotation of a second partial supposed ellipse around the optical axis. The first partial supposed ellipse is a part formed by division of a supposed ellipse along the optical axis. The second partial supposed ellipse is the remaining part formed by the division of the supposed ellipse along the optical axis. The supposed ellipse is in contact with a first supposed sectional circle at a first intersection point where the first supposed sectional circle and a first supposed circumscribed circle are intersected with each other. The supposed ellipse is further in contact with a second supposed sectional circle at a second intersection point where the second supposed sectional circle and a second supposed circumscribed circle are intersected with each other. The first supposed sectional circle is defined by section of a first supposed spherical surface along a plane which includes the principal point and the optical axis. The first supposed spherical surface is circumscribed to the first protrudent portions and formed around the principal point. The first supposed circumscribed circle is formed around a central point on the optical axis and including a first circumscribed point where the first protrudent portion and the first supposed spherical surface are circumscribed with each other. The second supposed sectional circle is defined by section of a second supposed spherical surface along the plane. The second supposed spherical surface is circumscribed to the second protrudent portions and formed around the principal point. The second supposed circumscribed circle is formed around the central point and including a second circumscribed point where the second protrudent portions and the second supposed spherical surface are circumscribed with one another.

DESCRIPTION OF THE PREFERRED EMBODIMENTS

Figure 1:
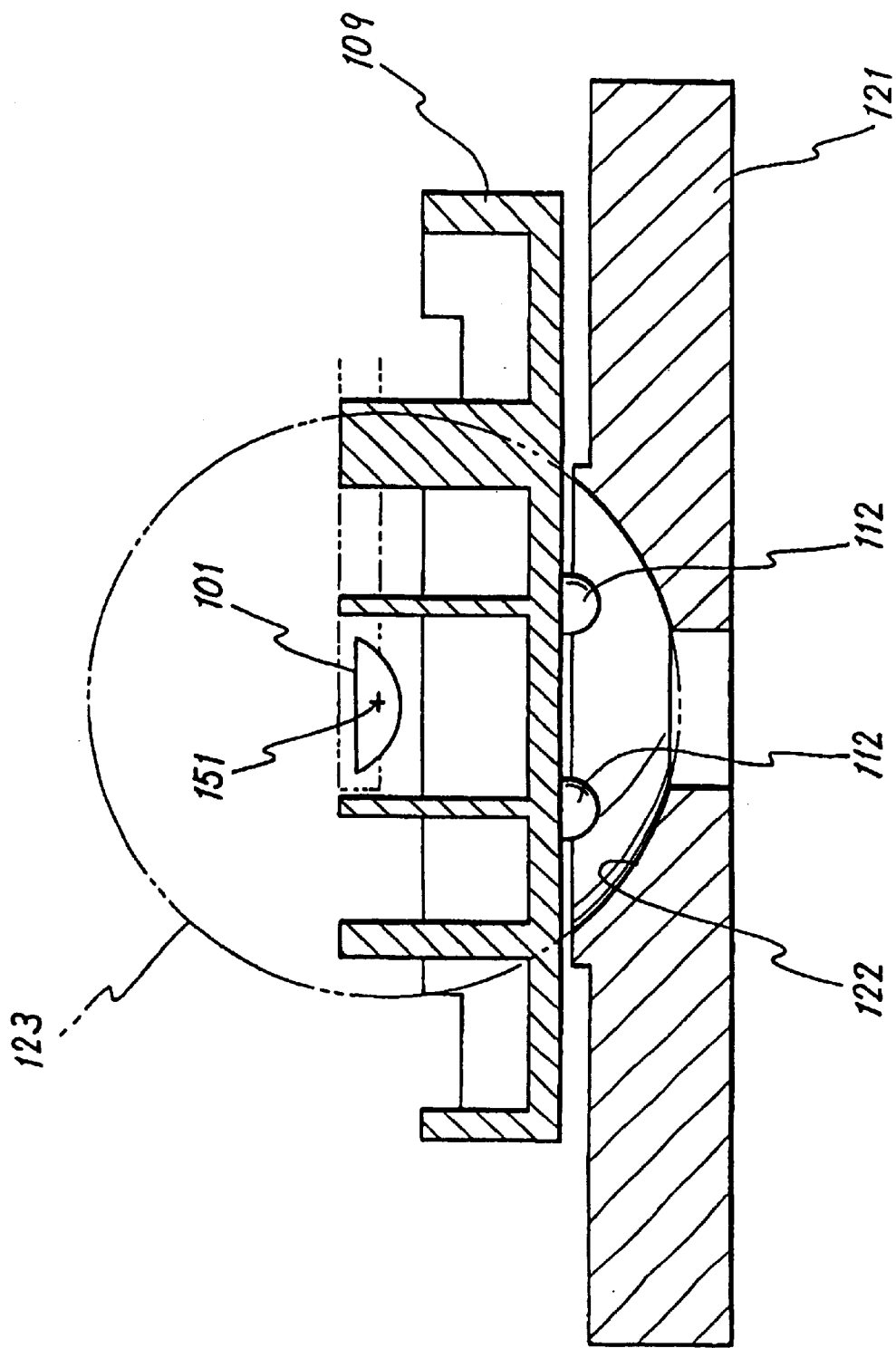
FIG. 1 is a cross sectional view of a structure for supporting an object lens by a technique related to this invention.

In order to facilitate an understanding of the present invention, description will be at first made with reference to the drawing about the object lens supporting unit as the related technique related to this invention described in the background of this specification.

Referring to FIG. 1, the object lens supporting unit comprising a head case 121 having a concave pedestal 122 for compensating for inclination of the object lens 101 in an object lens drive. In the unit, a supporting base 109 is provided with convex and spherical parts 112 onto a bottom surface thereof. The head case 121 is for supporting the supporting base 109 thereon and is provided with the concave pedestal 122 on an upper surface thereof. The concave pedestal 122 has a spherical surface along a spherical surface of an imaginary or a supposed sphere 123 drawn around a principal point 151 of the object lens 101 as central point. Since the supporting base 109 is supported on the head case 121 through only the convex and spherical parts 112, the convex and spherical parts 112 can be slid on the spherical surface of the concave pedestal 122. Therefore, the entire supporting base 109 can be tiled in every direction around the principal point 151 of the object lens 101. This structure has an advantage that the principal point 151 of the object lens 101 is almost invariable in position. It is therefore unnecessary to compensate for distance deviation of the object lens 101 in focusing and tracking directions after the object lens 101 was adjusted for inclination thereof.

The object lens supporting unit has problems described in the background.

Now, a preferred embodiment of the present invention will be described with reference to Drawings.

First embodiment

Referring to FIGS. 2 to 6, an object lens supporting unit 10 according to a first embodiment of this invention is applied to an optical disk drive for reading/writing data from/to an optical recording medium of disk type by irradiating laser beam to the medium and optically sensing reflected laser beam from the medium/by irradiating laser beam to the medium. The object lens supporting unit 10 is driven in a direction that traverses innumerable tracks formed on the optical medium and is positioned at a position which corresponds to a target track. Thus, the unit carries out irradiation of the laser beam to the target track to read/write data from/to the target track.

Figure 2:
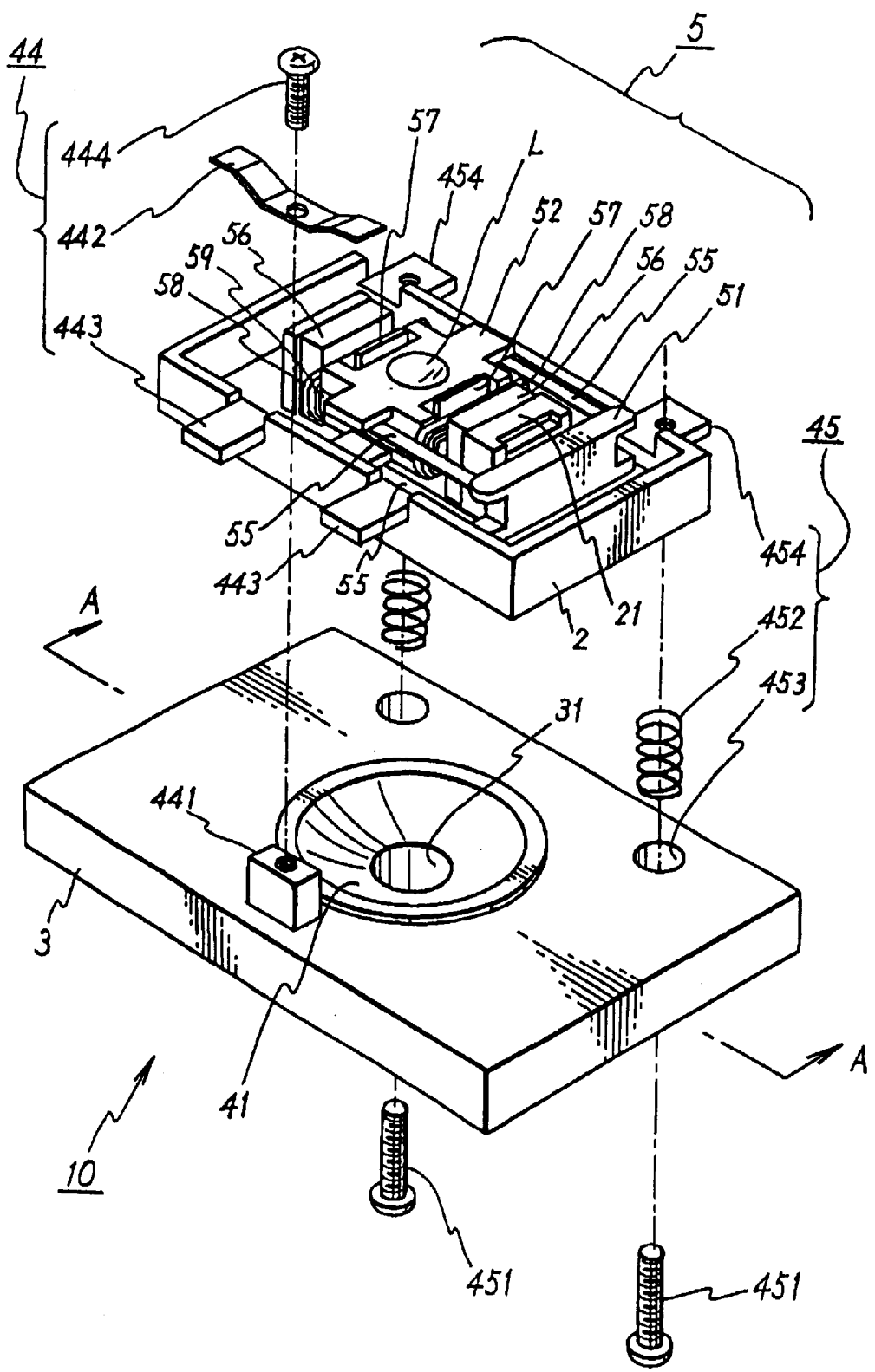
FIG. 2 is an exploded perspective view showing an object lens supporting unit according to a first embodiment of this invention.
Figure 3A:
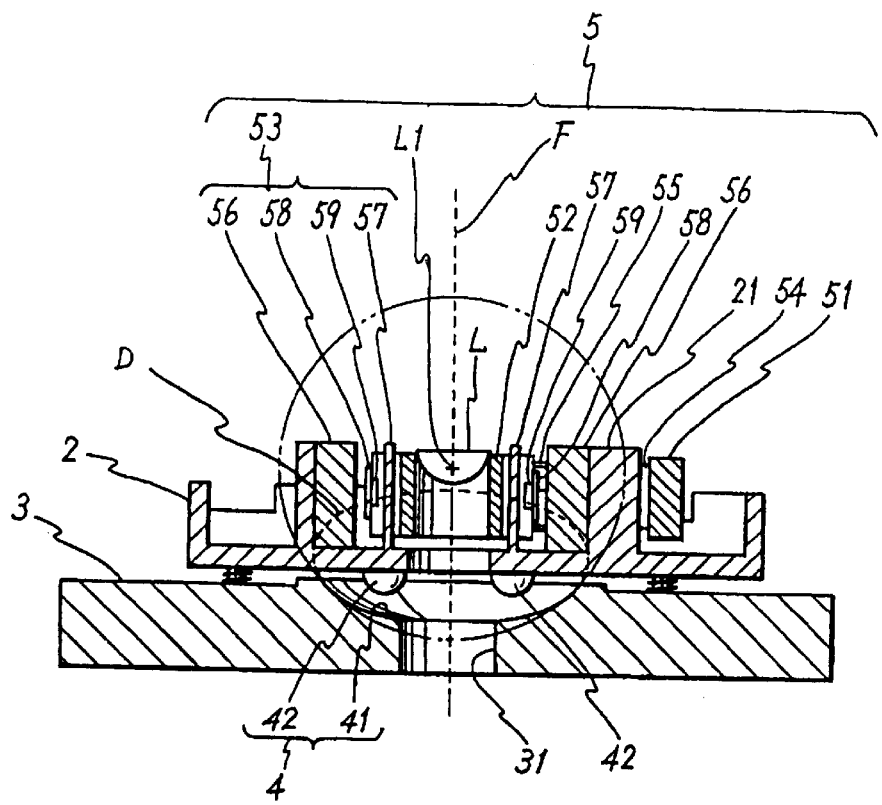
FIGS. 3A and 3B are a cross sectional view along a line A—A in FIG. 2 and a conceptual view for illustrating a positional relation between a supposed sphere and a supposed ellipse of the unit shown in FIG. 2 when has been assembled.

FIG. 2 is a exploded perspective view showing the object lens supporting unit 10. FIGS. 3A is a cross sectional view along a line A—A in FIG. 2 under the case that the assembly of the object lens supporting unit 10 is completed.

The object lens supporting unit 10 comprises a supporting frame 2 for supporting an object lens L, a base member 3 for mounting the supporting frame 2 thereon, and an adjusting mechanism 4 for supporting the supporting frame 2 with the supporting frame 2 universally tilted to the base member 3. The object lens L is used for converging laser beam irradiated form a laser source (not shown) in a constant direction. The object lens supporting unit 10 further comprises a drive unit 5 for driving the object lens L in focusing and tracking directions on the supporting frame 2. Herein, the focusing direction is a direction vertical to a recording surface on the optical medium, while the tracking direction is a direction transverse recording tracks formed on the optical medium.

The above-mentioned structure will be described in detail. Firstly, the base member 3 is supported by moving unit (not shown) so that it is movable in the tracking direction. Furthermore, the object lens supporting unit 10 without the base member 3 is mounted on the base member 3 and therefore the whole of the object lens supporting unit 10 moves in the tracking direction when the base member 3 is forced by the moving unit.

The base member 3 is formed into a plate-shape and is supported substantially in parallel to the recording surface of the optical medium by the moving unit. The supporting frame 2 is mounted over a top surface of the base member 3 through the adjusting mechanism 4 which will be later described in detail.

The supporting frame 2 is formed into a rectangular parallelpiped-shape with a top thereof opened and supported by the adjusting mechanism 4 so that a bottom surface thereof is faced in parallel to the top surface of the base member 3. Over an inside bottom surface of the supporting frame 2, the drive unit 5 is installed. The object lens L is held by the drive unit 5.

The drive unit 5 comprises a supporting portion 21, a lens holder 52, and a holder drive unit 53.

The supporting portion 21 is upwardly formed from the inside bottom surface and an intermediate body 51 supported by the supporting portion 21 so as to freely swing along the tracking direction. The lens holder 52 is for holding the object lens L supported by the intermediate body 51 so as to freely swing along the focusing direction. The holder drive unit 53 is capable of individually forcing the lens holder 52 in the tracking and the focusing directions individually so that the lens holder 52 is movable in the tracking and the focusing directions individually.

Namely, the intermediate body 51 is supported by the supporting portion 21 through a leaf spring 54 formed into a strip-shape. Since the leaf spring 54 is perpendicular to the recording surface of the optical medium and is extended along a tangent line of the track of the optical medium, the leaf spring 54 allows swing of the intermediate body 51 along the tracking direction by bending effect thereof.

The lens holder 52 holds the object lens L in a through hole thereof and does not interrupt that the laser beam progresses via the object lens L. The lens holder 52 is supported by the intermediate body 51 through four leaf springs 55. Since each of the leaf springs 55 is parallel to the recording surface of the optical medium and is extended along a tangent line of the track of the optical medium, the leaf springs 55 allow swing of the lens holder 52 along the focusing direction by bending effect thereof. Thus, the lens holder 52 is supported by the supporting frame 2 through the intermediate body 51 so as to freely swing in both the tracking and the focusing directions.

The holder drive unit 53 are structured comprises a permanent magnet 56 rigidly attached to the supporting frame 2, a yoke 57 rigidly attached to the supporting frame 2 so as to be spaced from the permanent magnet 56, and tracking and focusing coils 58 and 59 attached to the lens holder 52 between the permanent magnet 56 and the yoke 57. The tracking and the focusing coils 58 and 59 are attached to the lens holder 52 in such directions as to generate moving forces in the tracking and the focusing directions, respectively. The permanent magnet 56 and the yoke 57 are attached at both sides which exist the lens holder 52 therebetween, respectively.

As described above, the object lens supporting unit 10 is movable in the tracking direction in itself. However, a movement distance of the object lens L in the tracking direction forced by the holder drive unit 53 is very short relative to a movement distance of the object lens supporting unit 10 by the moving unit for the base member 3 in itself. Therefore, the object lens L is roughly positioned in the tracking direction by the motion of the object lens supporting unit 10 and is then precisely positioned at a position corresponding to a required track by the motion forced by the holder drive unit 53.

Next, the adjusting mechanism 4 will be described in detail.

The adjusting mechanism 4 comprises a pedestal portion 41, a plurality of protrudent portions 42, and a holding unit.

The pedestal portion 41 is formed on a top surface of the base member 3. The protrudent portions 42 are protruded from a bottom surface of the supporting frame 2 and are in contact with the pedestal portion 41. The protrudent portions 42 are capable of freely sliding on the pedestal portion 41. The holding unit limits the sliding motion of the protrudent portions 42 within a predetermined sliding range of the protrudent portions 42.

Figure 3B:
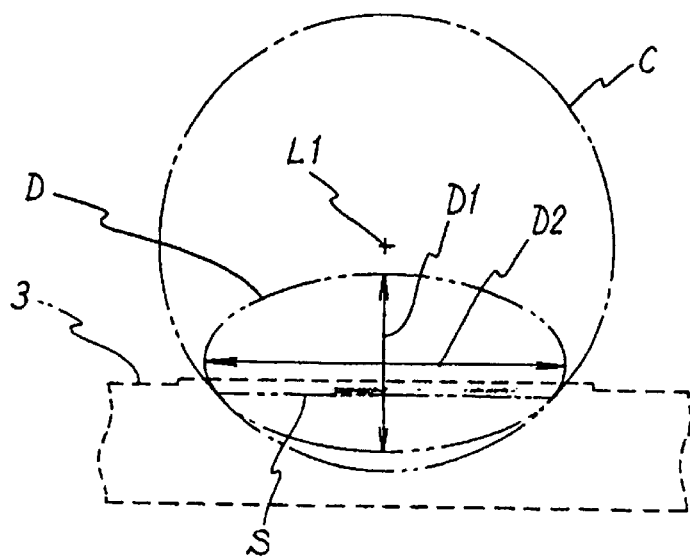

The pedestal portion 41 has a curved surface formed along a part of a surface of an imaginary or a supposed revolution body. The supposed revolution body is formed by rotation of an ellipse D (shown in FIG. 3B) around a minor axis D1 thereof. The minor axis D1 is substantially coaxial to an optical axis F through which the laser beam is passed. Herein, the laser beam is formed or designed so as to pass on a principal point L1 (will be described later) of the object lens L. As shown in FIG. 3B, the curved surface of the pedestal portion 41 corresponds at least to a surface of the supposed revolution body without a major axis D2 of the ellipse D. Namely, an intersection point between the minor and the major axes is located above and outside the pedestal portion 41. The pedestal portion 41 is formed or designed in direction and location so that an extended line extended from the minor axis D1 of the ellipse D passes through the principal point L1 of the object lens L supported by the supporting frame 2 when the supporting frame 2 is not inclined to the base member 3 (the top surface of the base member 3 is parallel to the bottom surface of the supporting frame 2).

A bottom section of the pedestal portion 41 is provided with a through hole 31 for passing the laser beam therein.

The protrudent portions 42 are provided on the bottom surface of the supporting frame 2. The number of the protrudent portions 42 is three. The protrudent portions 42 are formed into protrudent shape. Tip sections of the protrudent portions 42 are in contact with the curved surface of the pedestal portion 41 and are formed into a hemisphere-shape and are equal in size to each other. Thus, the protrudent portions 42 are in point-contact with the curved surface of the pedestal portion 41 so that a friction force between the curved surface and the protrudent portions 42 is reduced and that the protrudent portions 42 can freely slide on the curved surface.

Herein, when the supporting frame 2 is not inclined to the base member 3, a surface of the supposed revolution body defined by the ellipse D described above is inscribed to an imaginary or a supposed sphere surface C. The supposed sphere C has a central point which coincides with the principal point L1 of the object lens L supported by the supporting frame 2. However, it is supposed that a diameter of the supposed sphere surface C is longer than the major axis D2 of the ellipse D.

Thus, the protrudent portions 42 are formed or designed in an arrangement so that, when the supporting frame 2 is not inclined, each of the protrudent portions 42 are in contact with the pedestal portion 41 at a circumference S (shown in a line and a circle in FIGS. 3B and 4, respectively) formed on the surface of the pedestal portion 41. The circumference S corresponds to a circumference serving as an inscribed section. The protrudent portions 42 are radially arranged around a center portion of the pedestal portion 41. The protrudent portions 42 may be arranged in equiangular around the center portion of the pedestal portion 41.

Figure 4:
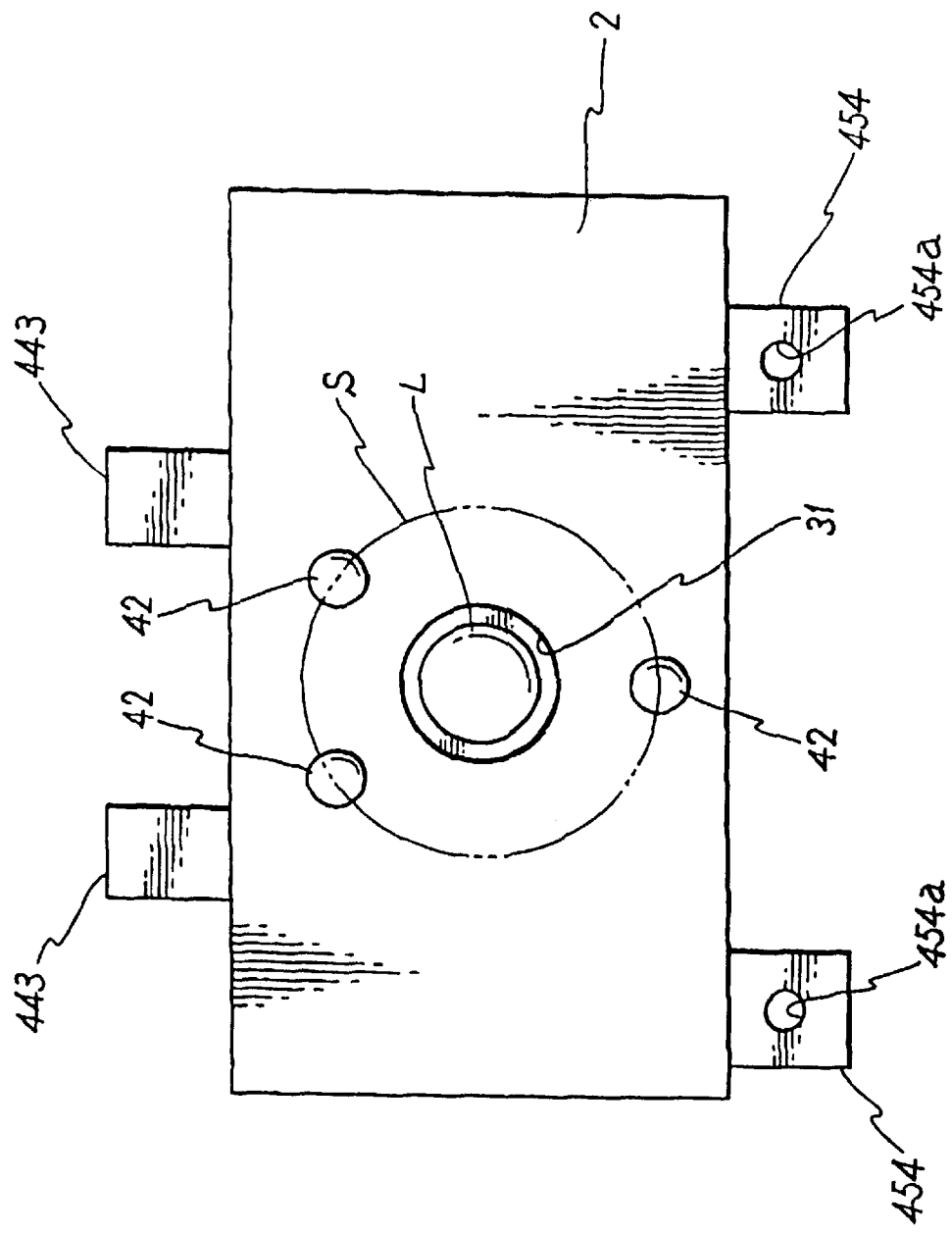
FIG. 4 is a plan view showing a bottom of a supporting frame of the unit according to the first embodiment of this invention.

Referring to FIG. 4, the circumference S further corresponds to a circumference serving as an inscribed section between the supposed sphere surface C and the supposed revolution body described above. As apparent from FIGS. 3B and 4, the protrudent portions 42 are arranged near the circumference S. Thus, the protrudent portions 42 are in contact with the curved surface of the pedestal portion 41 on the circumference S serving as the inscribed section between the supposed sphere surface C and the supposed revolution body and slide at this position.

On the curved surface of the pedestal portion 41, the circumference S as the inscribed section between the supposed sphere surface C and the supposed revolution body is equal in inclination to an inside surface of the supposed sphere surface C as apparent from that the circumference S is in contact with the supposed sphere surface C. Therefore, if the object lens L is compensated for inclination by sliding the protrudent portions 42 within a range near the circumference S, the principal point L1 of the object lens L little moves in position.

However, if a sliding distance of the protrudent portions 42 is enlarged, the protrudent portions 42 are apart from the inside surface of the supposed sphere C, so that the principal point L1 of the object lens L moves in position. However, the adjusting mechanism 4 is practically used for compensating for only inclination of the object lens L caused by a size error of parts in manufacturing process and a assembly error of parts in assembling process of the unit 10. Accordingly, an adjusting distance (a slide distance of the protrudent portions 42) is very small when the object lens L is compensated for inclination, so that the principal point L1 of the object lens L little moves in position.

Next, the holding unit will be described in detail.

The holding unit retains a condition in which the curved surface of the pedestal portion 41 and the protrudent portions 42 are in contact with each other, so that the curved surface of the pedestal portion 41 and the protrudent portions 42 are left from each other while the holding unit forces the supporting frame 2 to incline to the base member 3. Concretely, the holding unit comprise a spring mechanism 44 and two screw mechanisms 45 installed between the supporting frame 2 and the base member 3 as shown in FIG. 2. The spring mechanism 44 and the screw mechanisms 45 are radially arranged or arranged in equiangular around the center portion of the pedestal portion 41.

The spring mechanism 44 comprises a protrusion 441, a leaf spring 442, and two spring lug portions 443.

The protrusion 441 is formed on the top surface of the base member 3. The leaf spring 442 has a strip-shape attached on the protrusion 441 by a screw 444 with both ends thereof formed into slightly bent upwardly. The spring lug portions 443 are formed in protrudent form one end of the supporting frame 2 to be downwardly pushed and pressed by the ends of the leaf spring 442. Thus, at a position where the spring mechanism 44 is installed, the supporting frame 2 generates elasticity force in such direction as to be drawn.

On the other hand, each of the screw mechanisms 45 comprises an adjusting screw 451, a coil spring 452, a spring receiving hole portion 453, and a linkage portion.

The spring receiving hole portion 453 is formed on the top surface of the base member 3 serving as a bottomed hole for freely receiving the coil spring 452. The linkage portions are formed so as to protrude form the other end of the supporting frame 2. A through hole (not shown) for passing the adjusting screw 451 therein is formed on a bottom surface of the spring receiving hold portion 453 of the spring receiving hold portion 453. An internal thread 454a is formed on a central section of the linkage portion 454 so that the adjusting screw 451 is screwed into the internal thread 454a.

The coil springs 452 pushes the linkage portion 454 upwardly so that backlash of the adjusting screw 451 to the internal thread 454a is eliminated. Furthermore, the coil springs 452 serve to retain inclination of the supporting frame 2 straight-proportional to screwing amount of the adjusting screw 451.

With a structure mentioned above, a space between the supporting frame 2 and the base member 3 where the screw mechanism is installed is adjusted by screwing or unscrewing the adjusting screw 451. Since the holding unit comprise two screw mechanisms 45, the supporting frame 2 can be inclined in any directions to the base member 3 by the individually adjusting of each of the screw mechanisms 45. Furthermore, the holding unit serves to hold inclination of the supporting frame 2 in a constant when the adjusting screws 451 are stopped screwing.

An operation of the object lens supporting unit 10 will be described in detail with referring to FIGS. 2, 3, 5, and 6.

Firstly, the protrudent portions 42 attached on the bottom surface of the supporting frame 2 are put so as to contact to the curved surface of the pedestal portion 41 formed on the base member 3 on the curved surface as shown in FIGS. 2 and 3. Hereinafter, the supporting frame 2 is pressed downwardly to the base member 3 through the spring lug portions 443. Simultaneously, The coil springs 452 of the spring mechanisms 45 are inserted into the spring receiving hole portion 453. The adjusting screws 451 are screwed from a lower side of the base member 3 into the internal threads 454a formed on the linkage portions 454 of the supporting frame 2 through interior spaces of the coil springs 452.

The object lens supporting unit 10 assembled via a process mentioned above is installed in the optical disk drive. After that, a compensating operation for the inclination of the object lens L is carried out.

Figure 5:
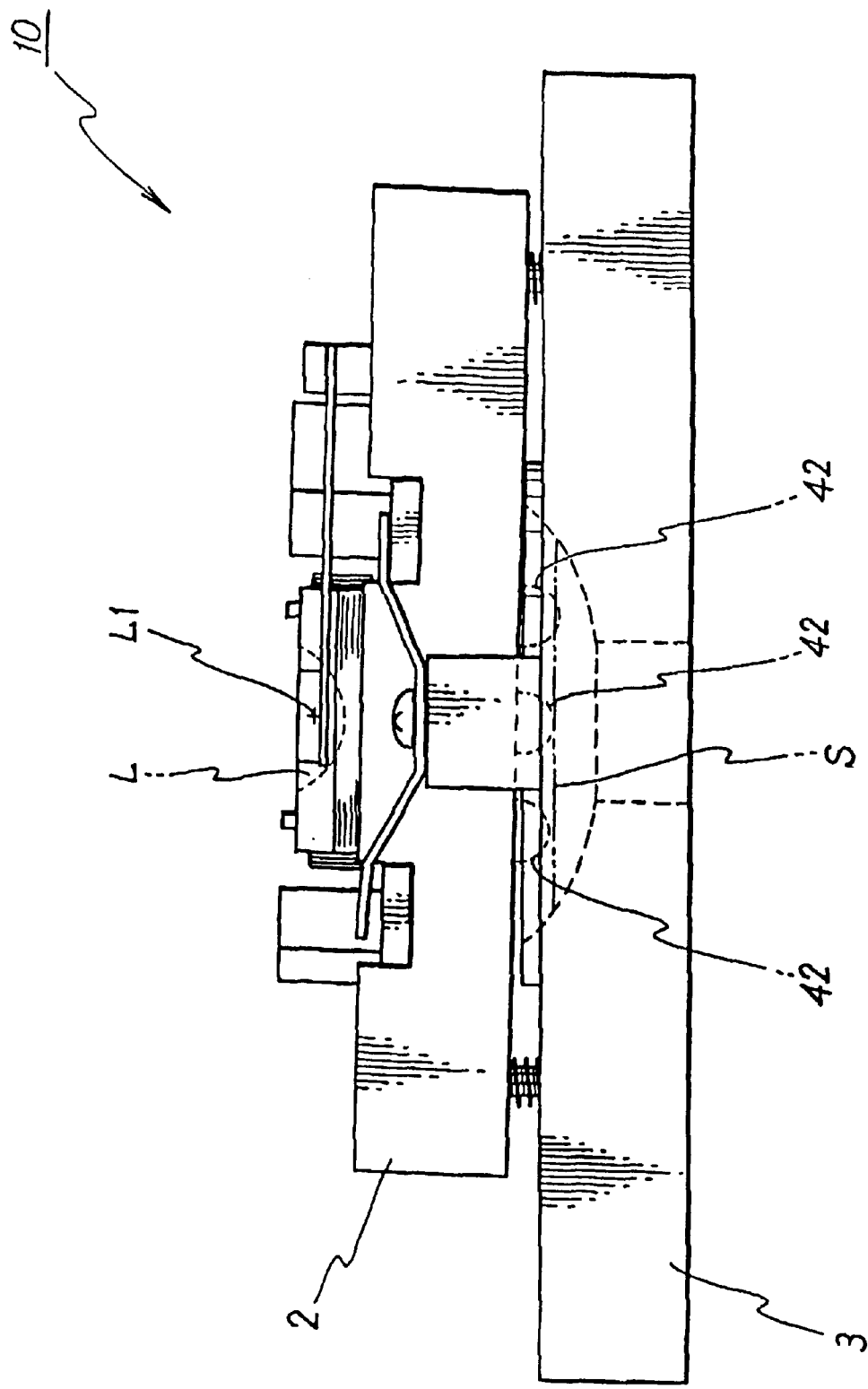
FIG. 5 is a front view of the unit according to the first embodiment of this invention on compensating for inclination.
Figure 6:
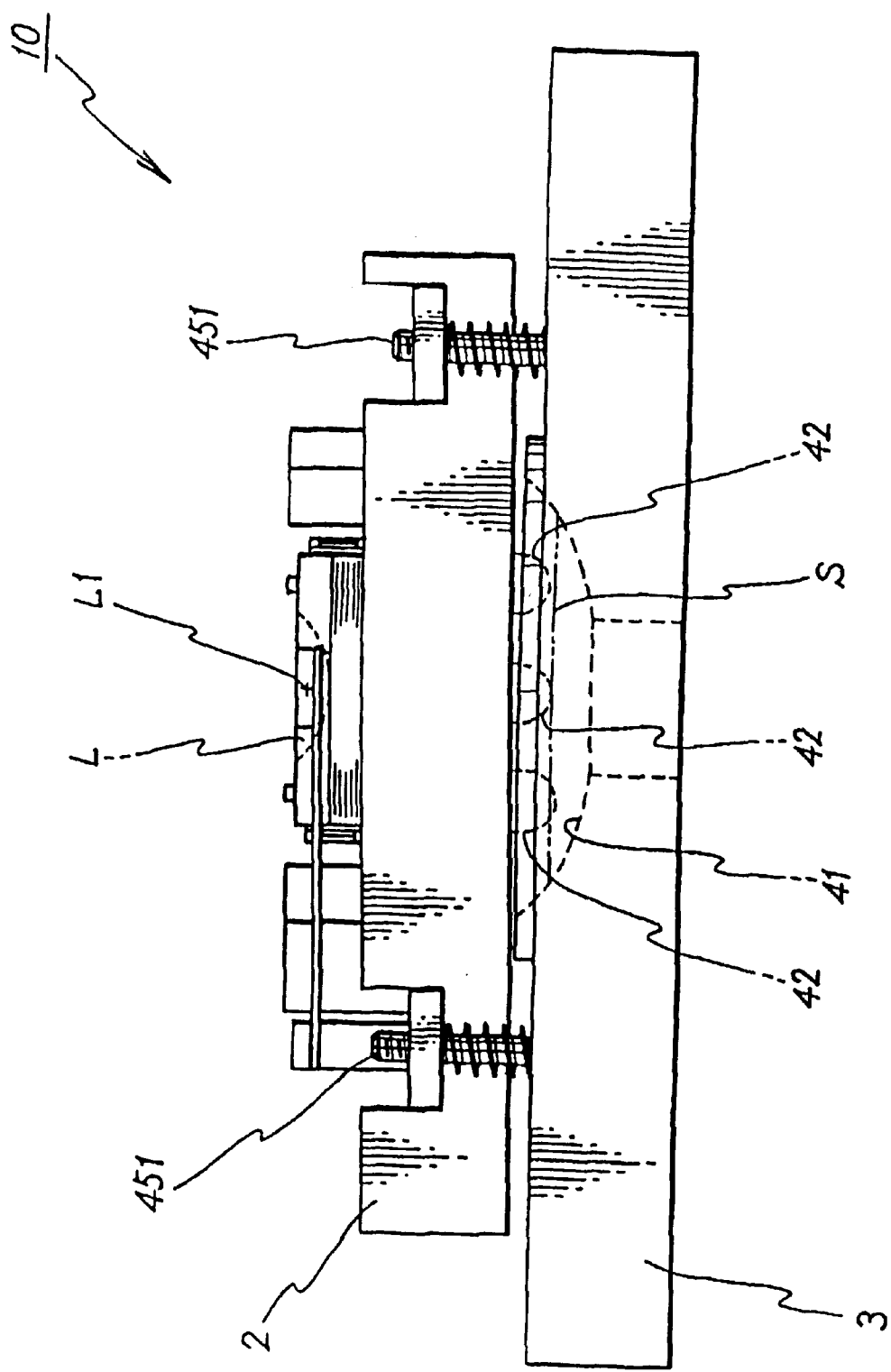
FIG. 6 is a backside view of the unit according to the first embodiment of this invention on compensating for inclination.

FIGS. 5 and 6 show the supporting frame 2 inclined to the pedestal portion 41 of the base member 3. In FIGS. 5 and 6, the inclination of the supporting frame 2 is illustrated in overstatement than real that in order to facilitate an understanding of the compensating operation according to this invention.

When the object lens L supported by the supporting frame 2 is inclined, the adjusting screw 451 of each of the adjusting mechanism 45 is screwed in moderation so that the supporting frame 2 is inclined in such direction that the inclination of the supporting frame 2 (the object lens L) is compensated. Herein, the protrudent portions 42 slide on the curved surface of the pedestal portion 41. However, the protrudent portions 42 slide by inclination approximately equal to that of the supposed sphere surface C because any of the protrudent portions 42 slide near the circumference S. Therefore, although the supporting frame 2 is made inclining, the principal point L1 of the object lens L little moves in position.

After compensating for the inclination of the object lens L, a compensated inclination of the supporting frame 2 is never moved or changed unless the adjusting screws 451 of the adjusting mechanism 45 are screwed or unscrewed. Thus, the object lens supporting unit 10 has been ready to be used for the optical disk drive. The object lens supporting unit 10 has installed into the optical disk drive. Hereinafter, after the object lens supporting unit 10 moves entirely so that the object lens L is approximately positioned near the required track, the object lens L is adjusted in the tracking and the focusing directions in detail so as to be positioned at the required track by the motion forced by the holder drive unit 53.

As described above, the principal point L1 of the object lens L little moves in position in the tracking and the focusing directions during and after the compensating operation for the inclination of the object lens L.

Furthermore, the curved surface of the pedestal portion 41 is formed along the supposed spherical surface C of the supposed revolution body based on the ellipse D having the major axis D2 shorter in length than a diameter of the supposed spherical surface C around the principal point L1 of the object lens L. As a result, it is possible to form the curved surface of the pedestal portion 41 shallower in a depth than that of the related technique and to form the base member 3 thinner in a height than that of the related technique. Therefore, the object lens supporting unit 10 according to this invention is capable of reducing in height and is therefore suitable to electrical apparatus of thin shape type such as the portable or the mobile computers.

Although the curved surface of the pedestal portion 41 is formed along the surface of the supposed elliptical revolution body formed by rotation of the ellipse D having the minor axis D1 coaxial to the optical axis F through which the laser beam is passed, a position of the minor axis D1 is not limited if the supposed elliptical revolution body is inscribed to the supposed spherical surface C around the principal point L1 of the object lens L (with the body indispensably rotated around the minor axis).

Thus, the supposed revolution body can be freely and variably set in direction without arranging the protrudent portions on a fixed location so as to be inscribed the supposed spherical surface (without arrangement on the circumference around the optical axis F the laser beam) as the related technique. Therefore, an arrangement of the protrudent portions 42 can be voluntarily selected.

Second embodiment

Figure 7:
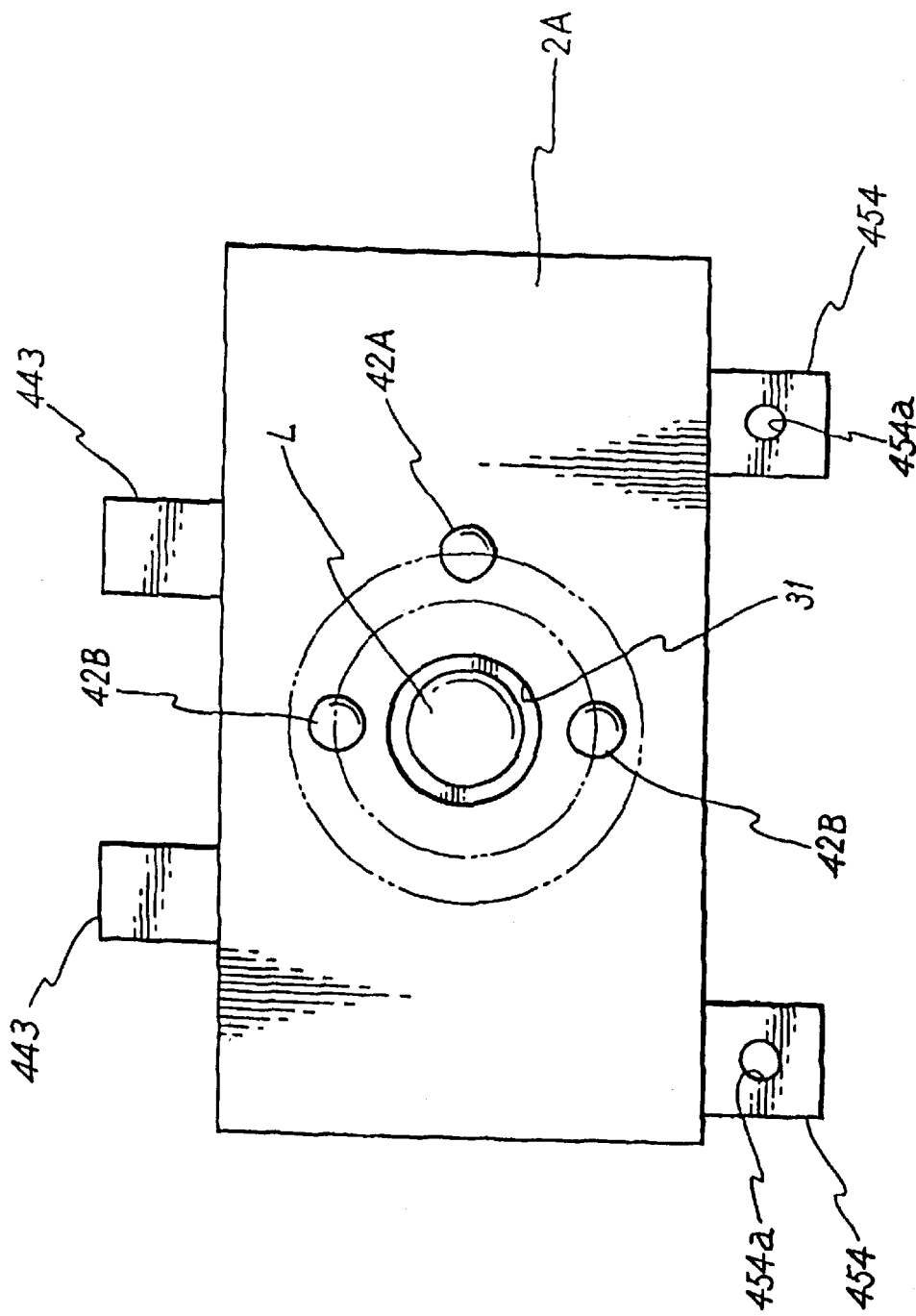
FIG. 7 is a plan view showing a bottom of a supporting frame of the unit according to a second embodiment of this invention.
Figure 8A:
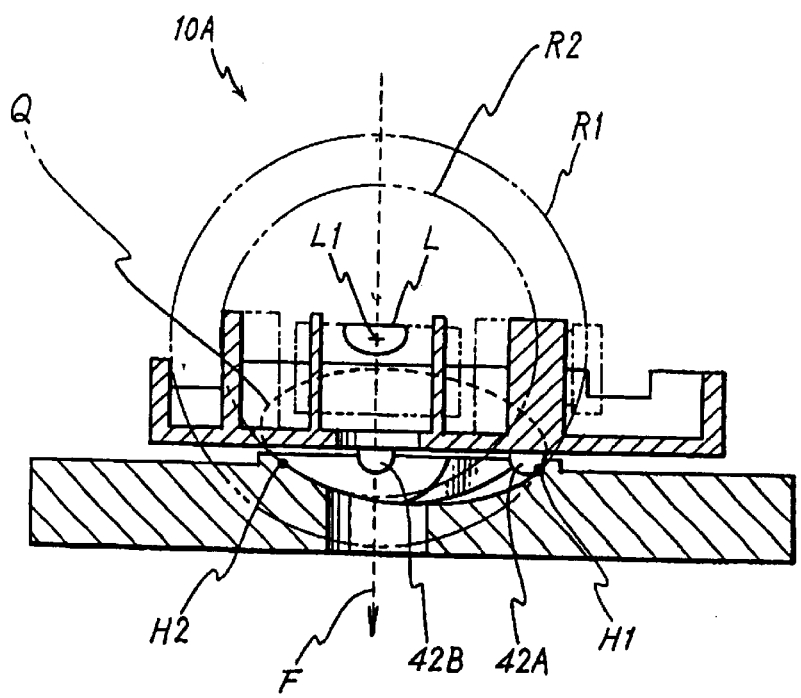
FIGS. 8A and 8B are a cross sectional view along an optical axis of an object lens and a conceptual view for illustrating arrangement of supposed circumscribed circles related to protrudent portions in the unit according to the second embodiment of this invention.
Figure 8B:
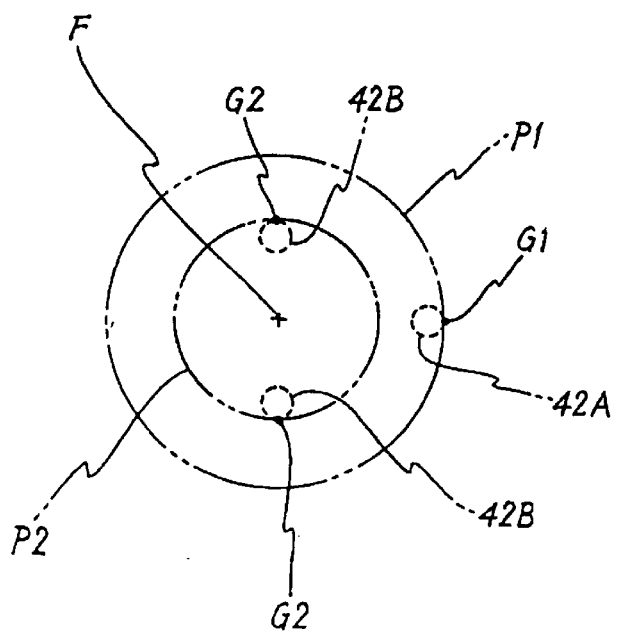
Figure 9:
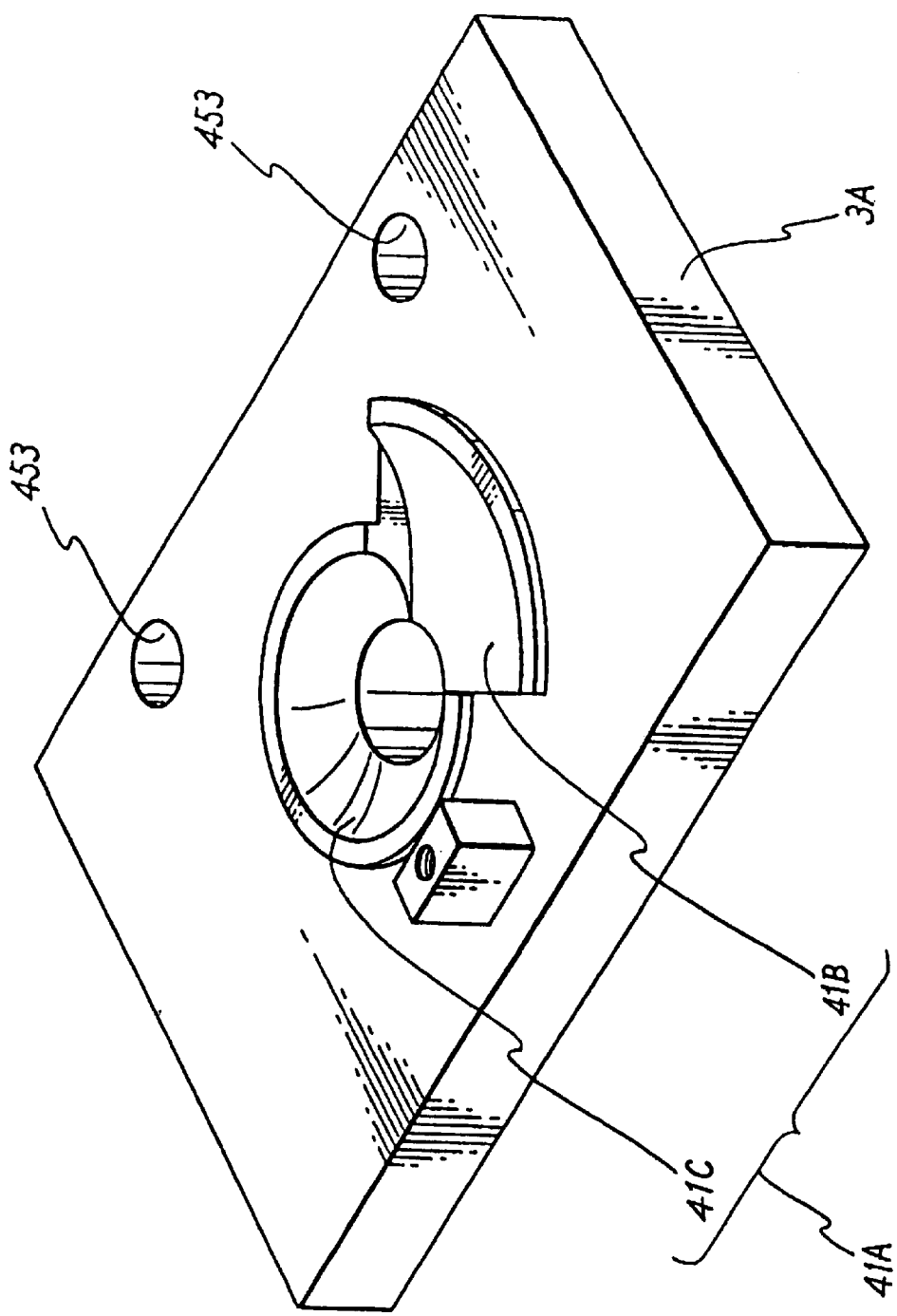
FIG. 9 is a perspective view of a base member of the unit according to the second embodiment of this invention.

Referring to FIGS. 7, 8, and 9, an object lens supporting unit 10A according to a second embodiment of this invention will be described. The object lens supporting unit 10A is applied to the optical disk drive so as to compensate for the inclination of the object lens L. In the following description, parts of the object lens supporting unit 10A same as/similar to the object lens supporting unit 10 are marked with the same numerals or symbols in the drawings and repetition will be omitted in description.

The object lens supporting unit 10A is mainly different from the object lens supporting unit 10 in protrudent portions and a pedestal portion. Therefore, the protrudent portions and the pedestal portion will be hereinafter described in detail.

FIG. 7 is a plan view of a bottom of a supporting frame 2A. As apparent from FIG. 7, the protrudent portions comprise a first protrudent portions 42A and second protrudent portions 42B. Referring to FIGS. 7 and 8A and 8B, the first protrudent portion 42A and the second protrudent portions 42B are different in a distance from the optical axis F through which the laser beam is passed.

Firstly, a supposed ellipse Q is set in supposition as shown in FIGS. 8A and 8B.

The supposed ellipse Q is in contact with a first supposed sectional circle R1 at a first intersection point H1 where the first supposed sectional circle R1 and a first supposed circumscribed circle P1 are intersected with each other.

The first supposed sectional circle R1 is defined by a section of a first supposed spherical surface along a plane which includes the principal point L1 of the object lens L and the optical axis F. The first supposed spherical surface is circumscribed to the first protrudent portion 42A and is formed around the principal point L1. The first supposed circumscribed circle P1 is formed around a central point on the optical axis F and includes a first circumscribed point G1 where the first protrudent portion 42A and the first supposed spherical surface are circumscribed with each other.

The supposed ellipse Q is further in contact with a second supposed sectional circle R2 at a second intersection point H2 where the second supposed section circle R2 and a second supposed circumscribed circle P2 are intersected with each other.

The second supposed sectional circle R2 is defined by a section of a second supposed spherical surface along the plane including the principal point L1 of the optical lens L. The second supposed spherical surface is circumscribed to the second protrudent portions 42B and is formed around the principal point L1. The second supposed circumscribed circle P2 is formed around the central point on the optical axis F and includes second circumscribed points G2 where the second protrudent portions 42B and the second supposed spherical surface are circumscribed with each other.

Herein, a perspective view of a base member 3A is shown in FIG. 9. A pedestal portion 41A formed on the base member 3A has a curved surface including first and second curved surfaces 41B and 41C.

The first curved surface 41B is formed along a part of a first supposed revolution body. The second curved surface 41C is formed along a part of a second supposed revolution body.

The first supposed revolution body is formed by rotation of a first partial supposed ellipse around the optical axis F through which the laser beam is passed. The second supposed revolution body is formed by rotation of a second partial supposed ellipse around the optical axis F.

The first partial supposed ellipse is a part formed by division of the supposed ellipse Q along the optical axis F. The second partial supposed ellipse is the remaining part formed by the division of the supposed ellipse Q along the optical axis F.

Thus, the first protrudent portion 42A is slidable on the first curved surface 41B of the pedestal portion 42A while the second protrudent portions 42B are slid on the second curved surface 41C of the pedestal portion 42A. Furthermore, the first protrudent portion 42A is slidable at an inclination equal to an inclination of the supposed ellipse Q on a contact point (H1) where the supposed ellipse Q and the first supposed sectional circle R1 are in contact with each other. The second protrudent portions 42A are slidable at an inclination equal to an inclination of the supposed ellipse Q on a contact point (H2) where the supposed ellipse Q and the second supposed sectional circle R2 are in contact with each other. As a result, the compensation for the inclination of the object lens L is carried out without the motion of the principal point L1.

Although the protrudent portions 42A, 42B, and 42B are not arranged as one another on the same circumference around the optical axis F, the compensation for the inclination of the object lens L can be carried out by using the first and the second curved surfaces 41B and 41C of the pedestal portion 41A. Namely, the optical lens supporting unit 10A has a new advantage that it is unnecessary to arrange all the protrudent portions 42A, 42B, and 42B on the same circumference around the optical axis F through which the laser beam.

While the invention has thus far been described in conjunction with the two embodiments thereof, it will readily be possible to put this invention into practice in various other manners.

What is claimed is:

1. An object lens supporting unit used for supporting an object lens for converging laser beam irradiated from a laser source in a constant direction, which comprises a supporting frame for supporting the object lens, a base member for mounting said supporting frame thereon, an adjusting mechanism for adjusting said supporting frame with the supporting frame universally tilted to the base member, said adjusting mechanism comprising:

a pedestal portion formed on a top surface of the base member;

a plurality of protrudent portions protruded from a bottom surface of said supporting frame, which are in contact with the pedestal portion, and which are capable of freely sliding along the pedestal portion; and holding means for limiting the motion of the protrudent portions within a predetermined sliding range of said protrudent portion;

said pedestal portion having a curved surface formed along a surface of a supposed revolution body, said supposed revolution body being formed by rotation of an ellipse around a minor axis thereof, said supposed revolution body being further inscribed to a supposed spherical surface formed around a central point, said central point being served by a principal point of said object lens supported by said supporting frame;

said protrudent portions being arranged so as to be in contact with said curved surface at positions which correspond to an area of said supposed revolution body inscribed to said supposed spherical surface.

2. An object lens supporting unit as claimed in claim 1, wherein said minor axis is substantially coaxial to an optical axis through which said laser beam is passed.

3. An object lens supporting unit as claimed in claim 1, wherein said holding means comprises a screw mechanism installed between said supporting frame and said base member, said screw mechanism comprising a screw and being capable of adjusting a space between said supporting frame and said base member by screwing of said screw.

4. An object lens supporting unit as claimed in claim 3, wherein said holding means comprises at least two said screw mechanisms.

5. An object lens supporting unit as claimed in claim 3, wherein said holding means comprises:

two said screw mechanisms; and a spring mechanism attached to said base member, said spring mechanism being for pressing said supporting frame downwardly;

said two screw mechanisms and said spring mechanism being arranged around said pedestal portion.

6. An object lens supporting unit used for supporting an object lens for converting laser beam irradiated from a laser source in a constant direction, which comprises a supporting frame for supporting the object lens, a base member for mounting said supporting frame thereon, an adjusting mechanism for adjusting said supporting frame with the supporting frame universally tilted to the base member, said adjusting mechanism comprising:

a pedestal portion formed on a top surface of the base member;

a first protrudent portion and a plurality of second protrudent portions protruded from a bottom surface of said supporting frame, which are in contact with said pedestal portion, and which are capable of freely sliding along the pedestal portion, said first protrudent portion and said second protrudent portions being equal in size to one another; and holding means for limiting the motion of each of said first protrudent portion and said second protrudent portions within a predetermined sliding range;

said pedestal portion having a curved surface including first and second curved surfaces;

said first surface being formed along a part of a first supposed revolution body, said second curved surface being formed along a part of a second supposed revolution body;

said first supposed revolution body being formed by rotation of a first partial supposed ellipse around an optical axis through which the laser beam is passed, said second supposed revolution body being formed by rotation of a second partial supposed ellipse around the optical axis;

said first partial supposed ellipse being a part formed by division of a supposed ellipse along said optical axis, said second partial supposed ellipse being the remaining part formed by the division of said supposed ellipse along said optical axis;

said supposed ellipse being in contact with a first supposed sectional circle at a first intersection point where said first supposed sectional circle and a first supposed circumscribed circle are intersected with each other, said supposed ellipse being further in contact with a second supposed sectional circle at a second intersection point where said second supposed sectional circle and a second supposed circumscribed circle are intersected with each other;

said first supposed sectional circle being defined by a section of a first supposed spherical surface along a plane which includes said principal point and said optical axis, said first supposed spherical surface being circumscribed to said first protrudent portions and formed around said principal point, said first supposed circumscribed circle being formed around a central point on said optical axis and including a first circumscribed point where said first protrudent portion and said first supposed spherical surface are circumscribed with each other;

said second supposed sectional circle being defined by a section of a second supposed spherical surface along said plane, said second supposed spherical surface being circumscribed to said second protrudent portions and formed around said principal point, said second supposed circumscribed circle being formed around said central point and including a second circumscribed point where said second protrudent portions and said second supposed spherical surface are circumscribed with one another.

* * * * *

UNITED STATES PATENT AND TRADEMARK OFFICE
CERTIFICATE OF CORRECTION

PATENT NO.    : 6,222,687 B1
DATED         : April 24, 2001
INVENTOR(S)   : Yoshihisa Nagashima It is certified that error appears in the above-identified patent and that said Letters Patent is hereby corrected as shown below:

Please change the title to -- [54] OBJECT LENS SUPPORTING UNIT COMPENSATING FOR INCLINATION OF OBJECT LENS --.

Signed and Sealed this

Thirtieth Day of October, 2001

*Attest:*

*Nicholas P. Godici*

NICHOLAS P. GODICI
*Acting Director of the United States Patent and Trademark Office*

*Attesting Officer*